W. B. FOUTS.
TRACTOR ENGINE.
APPLICATION FILED NOV. 19, 1913.
1,125,085.
Patented Jan. 19, 1915.
2 SHEETS—SHEET 1.
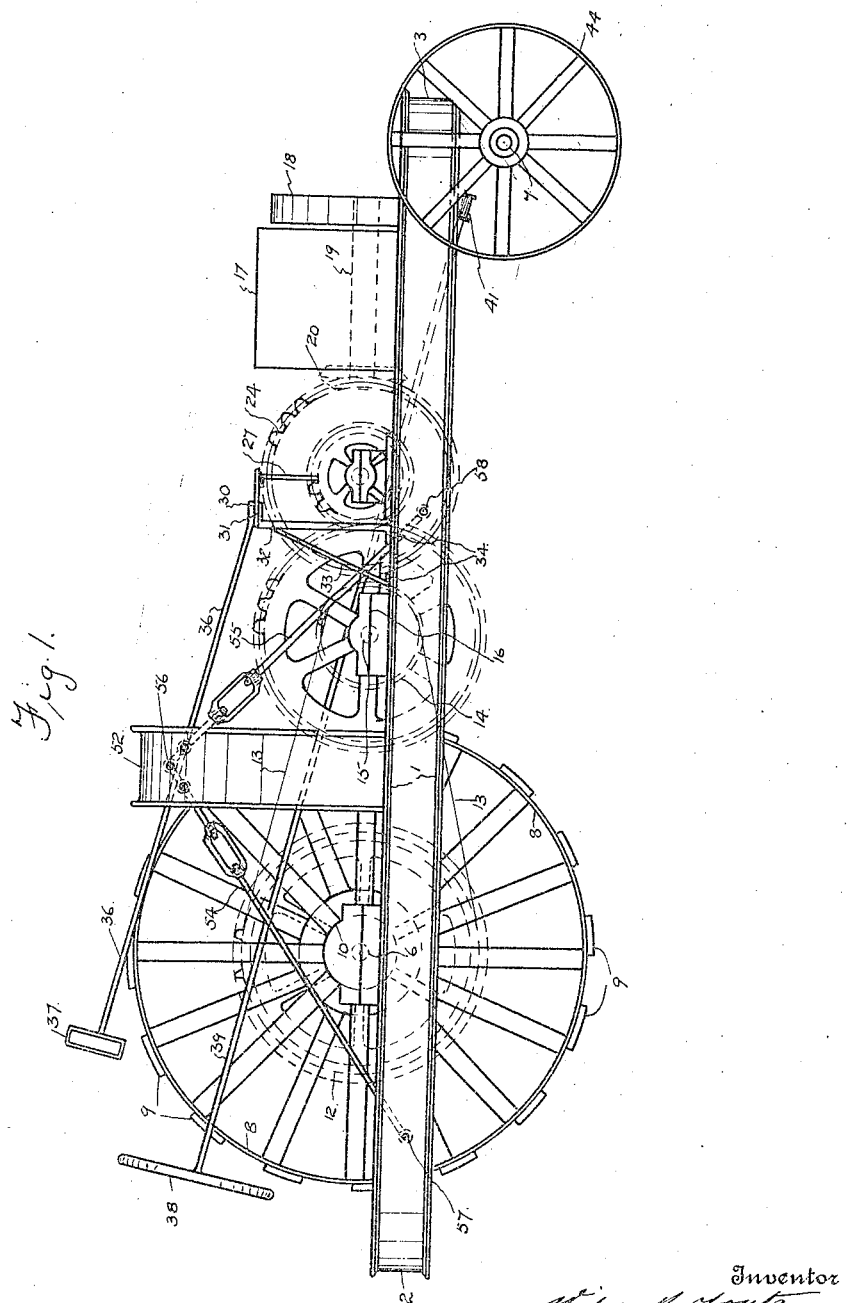
Witnesses
J. M. Jones
Gertie Nicholson
Inventor
Wiley B. Fouts
By Alfred Y. Bratton
Attorney

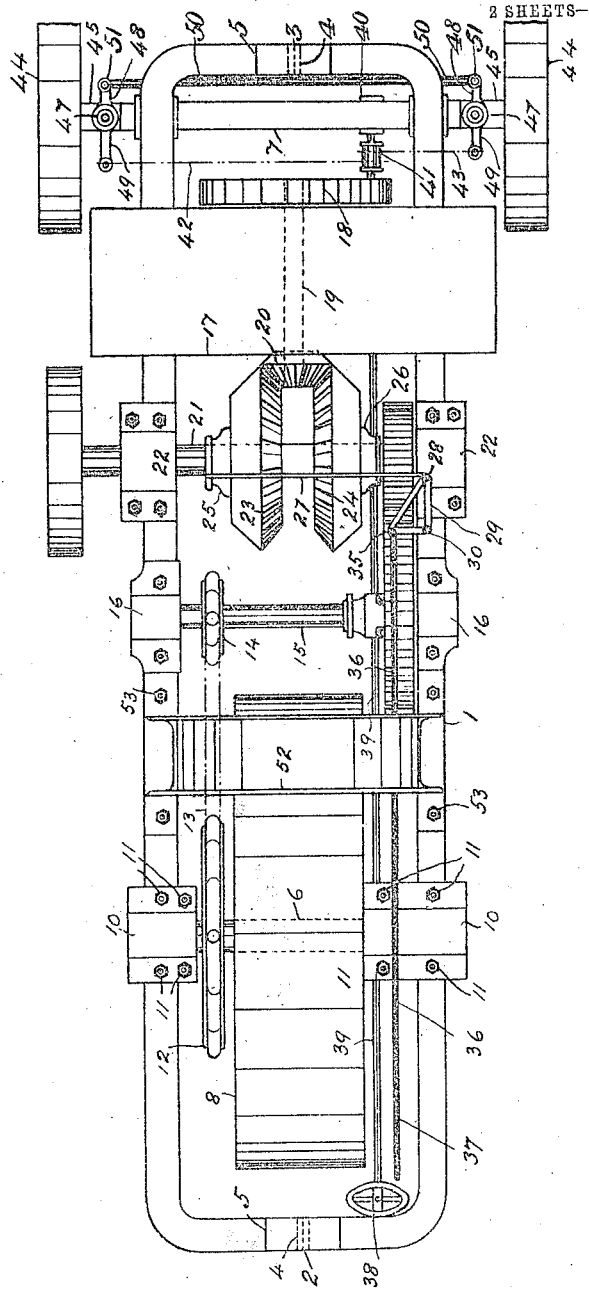

UNITED STATES PATENT OFFICE.

WILEY BROUGHER FOUTS, OF WICHITA, KANSAS.

TRACTOR-ENGINE.

1,125,085.  Specification of Letters Patent.  Patented Jan. 19, 1915.

Application filed November 19, 1913. Serial No. 801,969.

*To all whom it may concern:*

Be it known that I, WILEY BROUGHER FOUTS, a citizen of the United States of America, residing at Wichita, in the county of Sedgwick, State of Kansas, United States of America, have invented certain new and useful Improvements in Tractor-Engines, of which the following is a specification.

This invention relates to motor trucks, the object in view being to provide a traction driven truck, embodying a simple, strong and economical construction adapted to be propelled either in a forward or backward direction and to be easily steered, the truck as a whole being especially designed for use in drawing agricultural machines from place to place and across the fields and also adapted for use in driving stationary machines of all kinds.

The invention also has for further objects to provide a simple form of transmission controlled by the operator from his seat on the machine by means of which the power of the motor shaft may be utilized for driving the machine whether in a forward or backward direction; novel means for steering the machine; and novel means for bracing the main frame of the machine so as to enable it to sustain extraordinay shocks and the hard usage to which a motor truck of the class described is subject to in traveling over rough ground.

With the above and other objects in view, the invention consists in the construction, combination and arrangements of parts, as will be hereinafter more fully described, illustrated in the accompanying drawings and pointed out in the appended claim.

In the drawings:—Figure 1, is a side elevation of motor truck, embodying the present invention. Fig. 2, is a plan view of the same.

Like characters of reference designate the same parts in both figures of the drawings.

The motor truck according to this invention comprises an open center substantially rectangular frame embodying the oppositely arranged parallel side bars 1, the rear end cross bar 2, and the front cross bar 3, said cross bars being all formed of channel iron and the front and rear bars thereof being formed by bending the end portions of the side bars inwardly toward each other until they meet at the central points 4, where they are fastened together by means of splice bars 5, bolted or otherwise secured thereto as shown.

6, designates the driving axle and 7, the front axle, the driving axle having fast thereon a single centrally arranged traction wheel 8, provided on its outer face or periphery with angle or I-shaped traction ribs 9, preferably formed separately from the face of the wheel 8, and secured thereto by means of bolts—not shown—or their equivalent. The opposite ends of the driving axle 6, are journaled in bearings 10, secured to the side-bars of the frame, by bolts 11, 11.

Fast on the driving axle 6, at one side of the traction wheel 9, is a sprocket wheel 12, from which a chain 13 extends forwardly and passes around a smaller sprocket wheel 14, fast on a counter-shaft 15, which is located about midway between the front and rear axles and is parallel to the same. This counter-shaft is mounted adjacent to its opposite ends, in bearings 16, secured to the main frame.

17, designates a motor, preferably of the double horizontally opposed type, embodying a fly-wheel 18, and a shaft 19, which is provided at the rear end thereof with a bevel pinion 20, fast thereon.

Arranged behind the motor 17, is a transmission shaft 21, which is journaled in bearings 22 on the side-bars of the machine frame. Two bevel gear wheels 23, and 24, normally loose on the shaft 21, mesh into the pinion 20, at opposite sides of the latter and in connection with said wheels 23, and 24, sliding clutches 25, and 26, are employed, arranged on opposite sides of said wheels and adapted to throw said wheels alternately into engagement with the transmission shaft 21, said clutches being feathered to the shaft and constantly rotating therewith.

In order to simultaneously operate both clutches 25, and 26, a shifting yoke 27, extends over the wheels 23, and 24, and is provided with arms forked to engage grooves in the clutches as shown, said yoke 27, being extended at one end and having a jointed connection at 28, with a bell crank lever 29, which is fulcrumed at 30, on a fixed standard 31, having downwardly diverging legs 32, and 33, bolted, as shown at 34, to one of the side bars of the main frame. Connected at the other arm of the bell crank lever at point 35, is a pull and push rod 36, which extends to a point adjacent to the rear of the frame and closely adjacent to the hand steering wheel, hereinafter particularly described, where said rod terminates in hand grip or loop 37, which enables the operator by merely pulling or pushing on rod 36, to shift the clutches so as to set the gearing for driving forward or backward.

The operator's seat (not shown) will be supported at the rear end of the main frame 1, of the motor truck, and immediately in front of such seat will be arranged the hand steering wheel 38, mounted fast on a steering shaft 39, which extends forwardly and inclines downwardly, the forward extremity of said steering shaft being journaled in a suitable bearing or socket 40, on the front axle. Adjacent to the bearing 40, the shaft 39, has fast thereon a chain drum 41, around which oppositely extending chains 42, and 43, are wrapped in opposite directions.

The front or steering wheels 44, are journaled on the spindles 45, of a pair of steering knuckles, mounted to turn on vertical axes 47, at the opposite extremities of the front axle 7. Two armed levers are connected to each steering knuckle, each lever comprising a forwardly extending arm 48, and rearwardly extending arm 49, the chains 42, and 43, being connected to the arms 49, while the forwardly extending arms 48, are connected by an equalizing bar 50, which is pivotally connected at its extremities as shown at 51, to the arms 48, thereby insuring an equal turning of the steering knuckles, and a corresponding equal turning movement of the said wheels when the levers are operated by the chains 42, and 43, one of which is drawn around the drum 41, while the other is slackened or unwound therefrom.

An arched strut 52, extends over the forward portion of the traction wheel 8, and is terminally bolted at 53, to the side-bars of the frame. Extending in opposite directions from the upper portions of the arched strut 52, are braces 54, and 55, each set of braces at one side of the machine being connected to the arched strut by a single bolt 56, the rear braces are connected at their rear extremities to the side-bar of the frame in rear of driving axle as shown at 57, while the forwardly extending braces 55, are terminally connected to the side-bars of the frame at the points 58, adjacent to the transmission shaft 21, thereby forming an effective brace for that portion of the machine frame which lies in the rear of the motor, the weight of the latter being placed as near as possible over the front axle 7, so that the motor will not subject the frame of the truck to undue strain. Each of the braces 54, and 55, is provided with a turn buckle so that it may be maintained under tension.

A chain tightener is provided coöperating with the chain 13, said tightener sprocket wheel being journaled on a spindle which is carried by a lever fulcrumed on a bolt on the machine frame, and thereby providing for the adjustment of the wheel to take up slack in the sprocket wheel chain 13.

From the foregoing description it will be seen that the operator seated at or near the rear end of the frame has full control over the hand wheel 38, for steering purposes, and the rod 36, by means of which the clutches are shifted for throwing the opposite gear wheels 23, and 24, into and out of engagement with the transmission shaft and thereby changing the direction of propulsion of the truck. It is only necessary for the operator to either push the rod 36, or pull the same rearwardly in order to shift one clutch into engagement and the other simultaneously out of engagement thereby avoiding any possibility of stripping the gears 20, 23, and 24.

Having thus described my invention, what I claim as new, and desire to secure by Letters Patent, is:—

In a motor truck, a frame, a front axle, steering knuckles, mounted to turn on vertical axes at the opposite extremities of the front axle, steering wheels journaled on said knuckles, a rear driving axle, a central traction wheel fast thereon, a motor supported by the frame adjacent to the front axle, a transmission shaft parallel to and between the front and rear axles, a counter shaft parallel to the transmission shaft and geared thereto to rotate in the opposite direction, sprocket driving mechanism connecting said counter shaft and driving axle, a bevel pinion on the motor shaft, bevel gear wheels on the transmission shaft meshing with said pinion at opposite sides, clutches for throwing said gear wheels into and out of engagement with the transmission shaft, means for simultaneously shifting both clutches embodying a yoke connection to said clutches, a bell crank lever jointed to a yoke, a manually controlled push and pull rod for operating said bell crank lever, an arched strut terminally fastened to the side of the frame and located between the driving axle and the transmission shaft, and braces extending from the upper part of said strut in opposite directions and fastened to said side-bars adjacent to the transmission shaft and in rear of the driving axle.

Signed at Wichita, State of Kansas, this 24th day of October A. D. 1912.

WILEY BROUGHER FOUTS.

In presence of—
C. W. MATSON,
LUCY F. JONES.